(12) United States Patent
Krische et al.

(10) Patent No.: US 12,115,712 B2
(45) Date of Patent: Oct. 15, 2024

(54) EXTRUDER FOR THE EXTRUSION OF FOOD OR FEED

(71) Applicant: BÜHLER AG, Uzwil (CH)

(72) Inventors: Andreas Krische, Liyang (CN); Di Zhuang, Liyang (CN); Urs Wuest, Uzwil (CH)

(73) Assignee: Bühler AG, Uzwil (CH)

( * ) Notice: Subject to any disclaimer, the term of this patent is extended or adjusted under 35 U.S.C. 154(b) by 1065 days.

(21) Appl. No.: 16/978,494

(22) PCT Filed: Mar. 12, 2019

(86) PCT No.: PCT/EP2019/056177
§ 371 (c)(1),
(2) Date: Sep. 4, 2020

(87) PCT Pub. No.: WO2019/175185
PCT Pub. Date: Sep. 19, 2019

(65) Prior Publication Data
US 2021/0053268 A1      Feb. 25, 2021

(30) Foreign Application Priority Data
Mar. 12, 2018    (EP) ................................. 18161204

(51) Int. Cl.
*B29C 48/00*      (2019.01)
*A23P 30/20*      (2016.01)
(Continued)

(52) U.S. Cl.
CPC ............ *B29C 48/269* (2019.02); *A23P 30/20* (2016.08); *B29C 48/0022* (2019.02);
(Continued)

(58) Field of Classification Search
CPC ..... C29C 48/269; B29C 48/397; B29C 48/92; B29C 48/0022; B29C 48/022
See application file for complete search history.

(56) References Cited

U.S. PATENT DOCUMENTS 4,321,026 A * 3/1982 Lambertus ............ B29C 48/345
                                                         425/161
4,984,977 A   1/1991 Grimminger et al.
(Continued)

FOREIGN PATENT DOCUMENTS

| DE | 43 25 514 C1 | 10/1994 |
| GB | 2009972 A | 6/1979 |

(Continued)

OTHER PUBLICATIONS

International Search Report Corresponding to PCT/EP2019/056177 mailed Jun. 21, 2019.
(Continued)

*Primary Examiner* — Anshu Bhatia
(74) *Attorney, Agent, or Firm* — Finch & Maloney PLLC

(57) ABSTRACT

A single screw extruder (E) for the extrusion of food or feed, comprising in the direction of flow of a product to be extruded: i) a processing section (8); ii) a bypass outlet (B); iii) a valve plate (V); iv) a die plate (D); and iv) a cutter (6). The flow of product can be directed through the valve plate, under normal operating conditions of the extruder (E), and through the bypass outlet (B), during start-up of the extruder (E) or for maintenance purposes, downstream of the valve plate (V). The valve plate (V) is arranged on or in a mounting plate (M). The cutter (6) and the mounting plate (M) are provided with interacting guiding mechanism that prevent rotation of the cutter (6), vis-à-vis the mounting
(Continued)

Figure 1:
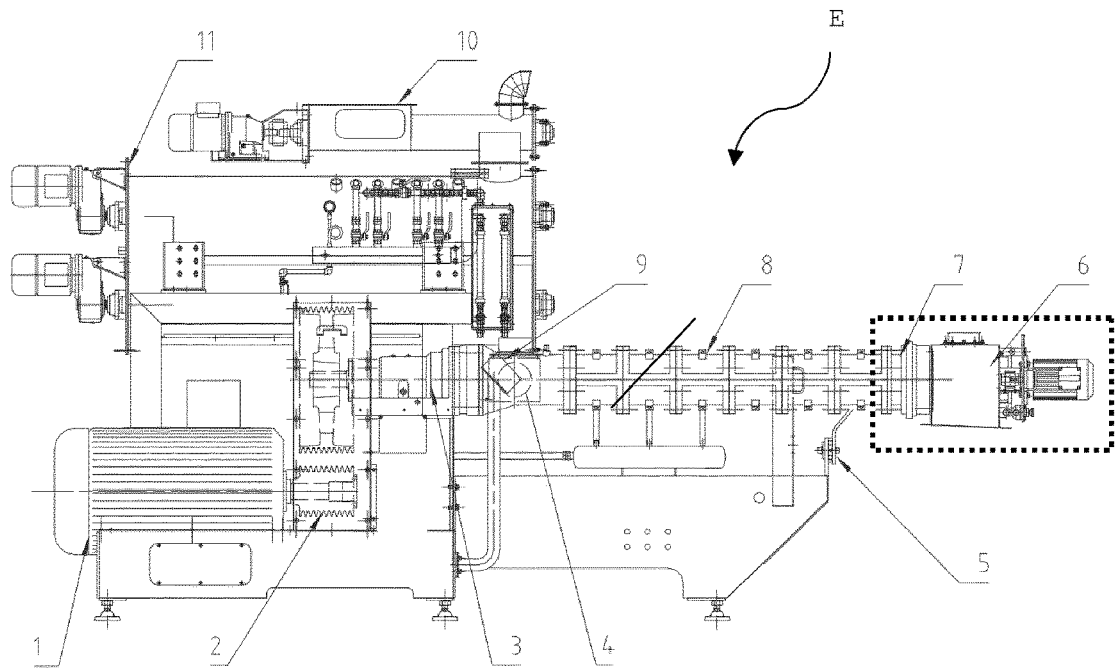

plate (M); and the cutter (6) and the mounting plate (M) are mechanically fastened to each other with rotational locking mechanism.

17 Claims, 3 Drawing Sheets

(51) Int. Cl.
  *B29C 48/25* (2019.01)
  *B29C 48/395* (2019.01)
  *B29C 48/92* (2019.01)
(52) U.S. Cl.
  CPC .......... *B29C 48/022* (2019.02); *B29C 48/397* (2019.02); *B29C 48/92* (2019.02); *B29C 2793/0027* (2013.01)

(56) References Cited

U.S. PATENT DOCUMENTS

| | | |
|---|---|---|
| 5,567,463 A | 10/1996 | Schaaf |
| 6,340,487 B1 | 1/2002 | Wenger et al. |
| 7,588,789 B1 | 9/2009 | Kearns et al. |
| 7,654,813 B1 | 2/2010 | Kearns et al. |
| 7,785,094 B1 | 8/2010 | Kearns et al. |
| 8,246,240 B2 | 8/2012 | Wenger |
| 2002/0031589 A1 | 3/2002 | Wenger et al. |
| 2004/0043094 A1 | 3/2004 | Hauck et al. |
| 2010/0260882 A1 | 10/2010 | Kearns et al. |
| 2013/0224321 A1 | 8/2013 | Eloo et al. |
| 2014/0175695 A1 | 6/2014 | Eloo et al. |

FOREIGN PATENT DOCUMENTS

| | | |
|---|---|---|
| GB | 2 017 571 A | 10/1979 |
| WO | 01/72150 A1 | 10/2001 |
| WO | 02/069744 A1 | 9/2002 |

OTHER PUBLICATIONS

Written Opinion Corresponding to PCT/EP2019/056177 mailed Jun. 21, 2019.
Chinese Office Action Corresponding to 201980018201.5 mailed Sep. 10, 2021.

* cited by examiner

EXTRUDER FOR THE EXTRUSION OF FOOD OR FEED

The invention relates primarily to a primarily single screw extruder for the extrusion of food or feed, equipped with a cutter downstream of the die plate. The concept of the invention may also be applied to a twin screw extruder.

It typically takes some time for such extruder to provide for stable operating conditions upon startup, and it is not desired to direct the product flow through the die and into the cutter until the conditions are stable. Towards this end, a sanitary start-up and discharge system, SSDS, may be implemented. Such devices have a valve arranged downstream of the processing section of the extruder and upstream of an extruder die plate. This valve can be fully closed e.g. upon start-up of the extruder, and the product is then directed from the processing section through a bypass outlet. No product is directed through the die plate and the cutter under this operating condition. This operating condition is also useful upon shut-down of the extruder and when maintenance is to be done downstream of the valve, e.g. when the die plate has to be changed or any maintenance has to be carried out in the cutter.

Under normal operating conditions, the valve of the SSDS is adjusted such that the product flow is directed through the valve plate, the die plate and into the cutter. No product flow is directed through the bypass outlet under this operating condition.

The valve may also be partially closed in operation to build up a controlled back pressure into the processing section, thereby regulating specific mechanical energy, SME, that is introduced into the product in a processing zone of the extruder.

While such an SSDS is very useful in terms of controlling operation of the single screw extruder, as outlined above, the handling of such devices is still overly cumbersome in practice. Mounting of such an SSDS on the extruder is typically done with a flange that has multiple screwed joints circumferentially arranged around the valve plate. Such multiple screwed joints are reliable when properly fixed, but they need to be exactly fixed and symmetrically tightened in order to prevent leakages.

There remains a need for a single screw extruder having an SSDS, die plate and cutter that is easier to operate and having an SSDS, die plate and cutter which are easier to handle and which can be more reliably fitted and aligned on a single screw extruder. It is thus an object of the present invention to overcome the above mentioned drawbacks of the prior art, in particular to provide an extruder with a SSDS, die plate and cutter that can be easily handled and reliably fitted.

This object is solved with a single screw extruder for the extrusion of food or feed, comprising in the direction of flow of a product to be extruded:
  a processing section which typically comprises multiple barrels;
  a bypass outlet;
  a valve plate;
  a die plate; and
  a cutter, typically equipped with (a) rotating knife(s) that cut(s) the product exiting the die plate into smaller pieces. The rotating knife(s) is/are contained in a cutter housing.

The flow of product can be directed through the valve plate under normal operating conditions of the extruder, and through the bypass outlet during start-up of the extruder or for maintenance purposes downstream of the valve plate.

The valve plate is arranged on or in a mounting plate. The valve plate is preferably equipped with slits that extend from the center to the outer section of the valve plate. The valve plate can be rotatable vis-à-vis a backing plate with complementary openings so that depending on the relative positions of valve plate and backing plate the flow of product through the valve plate can be completely blocked, partially blocked, or the flow of product is allowed through the whole cross-section of the slits in the valve plate.

The cutter and the mounting plate are provided with interacting guiding means that prevent rotation of the cutter vis-à-vis the mounting plate. The guiding means as such are not providing for any mechanical fixation of the mounting plate towards the cutter parallel to the main direction of the product flow. This greatly facilitates the orientation of the cutter towards the mounting plate during assembly of the overall setup, without the need to perfectly align e.g. screw holes.

The cutter and the mounting plate are mechanically fastened to each other with rotational locking means.

In preferred embodiments, the interacting guiding means that prevent rotation of the cutter vis-à-vis the mounting plate are
  pins, preferably provided on the cutter; and
  holes or blind holes, preferably provided in the mounting plate.

Mounting of the cutter on the mounting plate is greatly facilitated since the technician only needs to direct the pins into the holes or blind holes, without the need to worry about a perfect orientation for placing screws in order to not impair threads.

In further preferred embodiments, the rotational locking means that mechanically fasten the cutter and the mounting plate to each other are
  a rotatable locking ring, provided with a first set of mechanical fastening elements; and
  a second set of mechanical fastening elements that interlock with the first set of mechanical fastening elements.

Said second set of mechanical fastening elements preferably is positionally fixed. The rotatable locking ring is arranged around the flow path for the product. Use of a rotatable locking ring allows for a very even distribution of forces upon fastening the mounting plate to the cutter.

It is further preferred that the rotatable locking ring with the first set of mechanical fastening elements is provided on the cutter; and the second set of mechanical fastening elements is provided on the mounting plate. Having arranged the rotatable locking ring on the cutter allows for easier maintenance of movable parts since the cutter can be easily detached from the extruder.

The elements of the second set of mechanical fastening elements can be provided as angle brackets extending away from the mounting plate towards the cutter, which angle brackets provide undercuts that are engaged behind by elements of the first set of mechanical fastening elements.

It is particularly preferred that the first set of mechanical fastening elements and the second set of mechanical fastening elements have complementary tapered surfaces that are friction-locked against each other when the cutter and the mounting plate are mechanically fastened to each other.

Alternatively, the first set of mechanical fastening elements can also be formed as a male thread, either continuous or segmented; and the second set of mechanical fastening elements can be formed as a female thread, either continuous or segmented.

In yet another alternative embodiment, the first set of mechanical fastening elements and the second set of mechanical fastening elements can be formed as complementary elements of a bayonet coupling.

Preferably, the locking ring with the first set of mechanical fastening elements; and/or the second set of mechanical fastening elements are pneumatically operated, hydraulically operated or operated by a motor. Hydraulic operation is particularly preferred. In any event, the operation needs to assure that the necessary forces can be exerted on the first and second set of fastening elements in order to provide for a tight fixation of the cutter on the mounting plate.

Preferably, the position in which the cutter and the mounting plate are mechanically fastened to each other by the rotational locking means can be mechanically locked, e.g. with a pin that blocks rotation of the locking ring. Thereby, it is not necessary to permanently keep the hydraulic, pneumatic or motor-driven operation of the locking ring active. For deblocking of the first and second set of mechanical fasting elements, and/or the mechanical lock of the rotational locking means (e.g. the pin), there can be provided yet another hydraulic, pneumatic or motor-driven actuating mechanism.

In preferred embodiments, the die plate is hinge-mounted so that the die plate can be swiveled-out when the cutter is dismounted. This allows for easy access to the valve plate without the need to fully dismount the die plate.

Accordingly, yet another aspect of the invention pertains to a method of mounting an extruder as outlined herein, comprising the steps of:
  providing a mounting plate;
  providing a cutter;
wherein the cutter and the mounting plate are equipped with interacting guiding means as outlined above; preferably pins, and holes or blind holes;
  arranging cutter and mounting plate such that the interacting guiding means prevent rotation of the cutter vis-à-vis the mounting plate, as outlined above; and
  mechanically fasten the cutter at the mounting plate with rotational locking means provided on the mounting plate and the cutter, as outlined above.

Yet another aspect of the invention pertains to a method of operating an extruder as outlined herein, wherein
  the valve plate is closed during start-up of the extruder or for maintenance purposes downstream of the valve plate, in order to direct the flow of product through the bypass outlet, as outlined above; and/or
  the valve plate is at least partially opened under normal operating conditions of the extruder, as outlined above.

Further, the invention advantageously allows for retrofitting single screw extruder. Thus, yet another aspect of the invention pertains to a kit comprising
  a cutter for a single screw extruder, as outlined above;
  a mounting plate for a single screw extruder, as outlined above;
wherein the cutter and the mounting plate are provided with interacting guiding means that prevent rotation of the cutter vis-à-vis the mounting plate, as outlined above; and wherein the cutter and the mounting plate are mechanically fastened to each other with rotational locking means, as outlined above.

The invention will now be explained in further detail by means of specific embodiments and illustrative figures. It is to be understood that the invention is not limited in any way to these illustrative embodiments.

Figure 2:
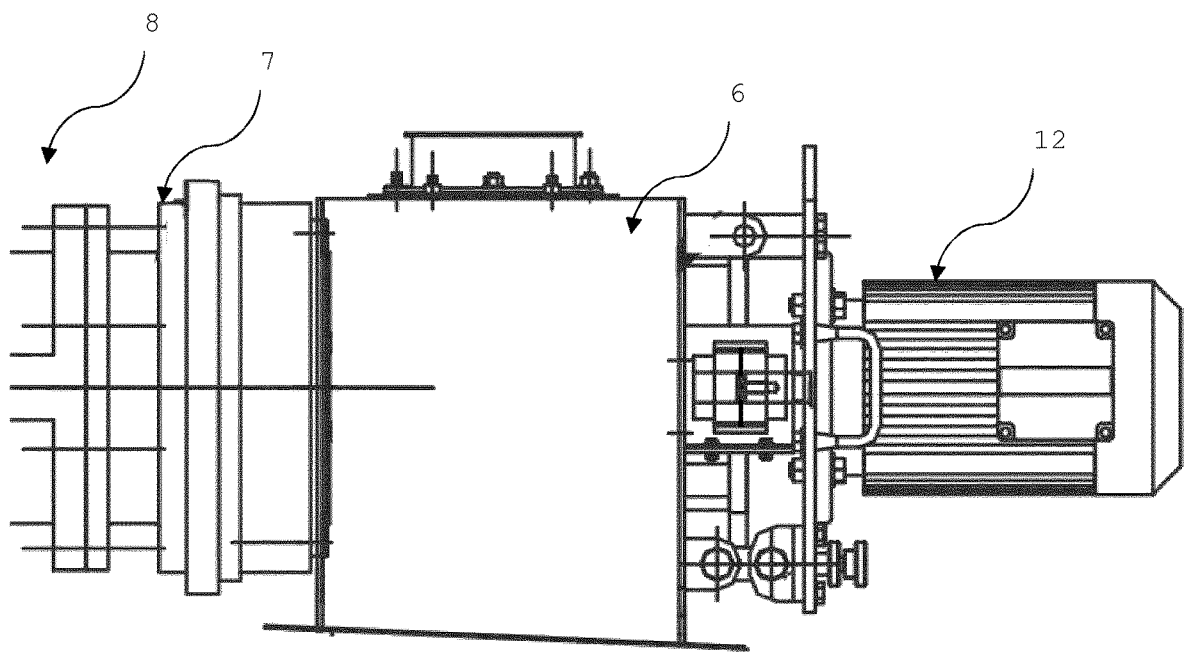
Figure 3:
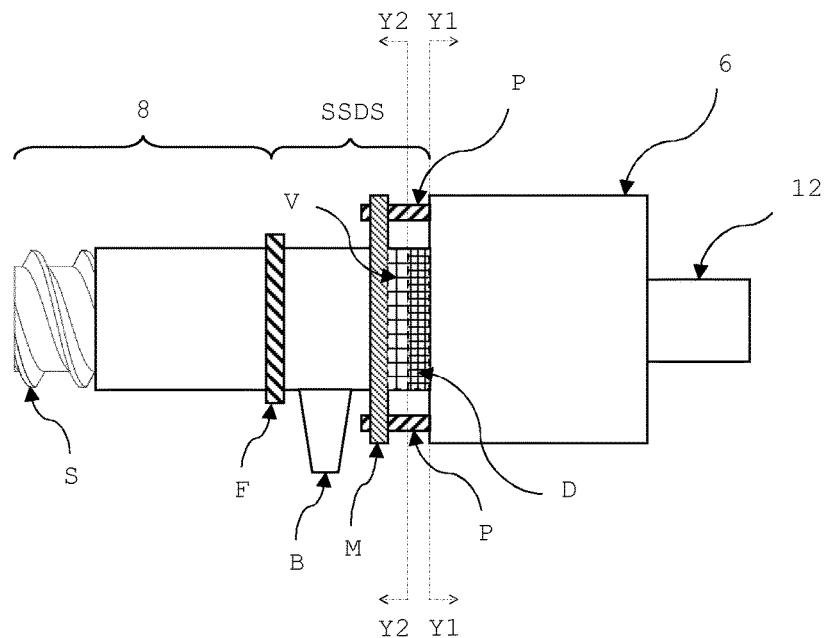
Figure 4A:
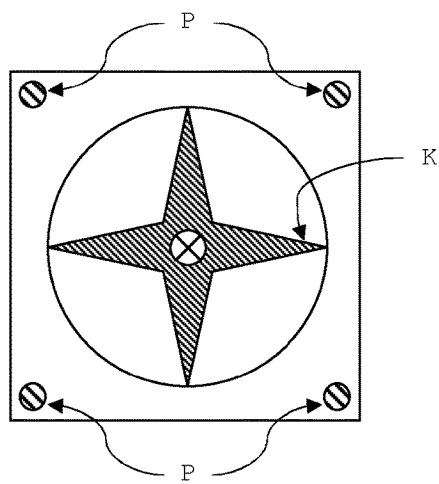
Figure 4B:
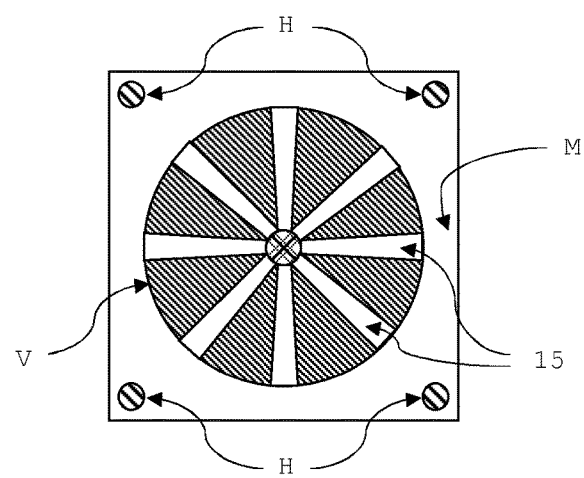
Figure 5A:
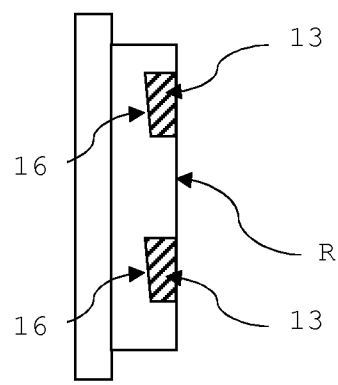
Figure 5B:
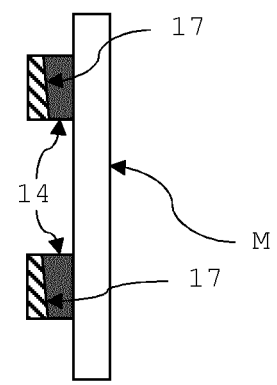

FIG. 1: Single screw extruder with cutter (prior art);
FIG. 2: Partial view from FIG. 1;
FIG. 3: Side-view of an extruder according to the invention from the end of the processing section onwards (schematically);
FIG. 4a: Cross-sectional view (schematically) of FIG. 3 from the plane Y1;
FIG. 4b: Cross-sectional view (schematically) of FIG. 3 from the plane Y2;
FIG. 5a: Side view (schematically) of a locking ring with elements of the first set of mechanical fastening elements;
FIG. 5b: Side view (schematically) of elements of the second set of mechanical fastening elements.

A typical single screw extruder E that is known in the art is shown in FIG. 1. The extruder E is powered by a main motor 1 to which a drive unit 2 and a bearing chamber 3 are associated. The processing section 8 is typically made up from several so-called barrels that are supported by a barrel support 5. Raw product is supplied to the extruder E through a side feeder 4 and is transported through the processing section 8 by a screw (not shown). Prior to entering the processing section 8, the raw product can be pretreated in a so-called conditioner or retentioner, and is then fed to the side feeder 4 via a feeder 10. The configuration of the screw can vary over the length of the processing section 8, depending on the product to be extruded. The extruder E is operated by a technician via a control panel 9. At the end of the processing section 8, there is die head comprising a die plate 7. Downstream of the die head, a cutter 6 is arranged. The cutter 6 is equipped with a rotating knife that cuts the strands exiting the die into pellet. The size of the pellets depends on both the flow rate of the product and the rotating speed of the knife of the cutter 6.

The invention specifically concerns the interface between the processing section 8 and the cutter 6; this area is marked with a dotted line in FIG. 1 and reproduced in an enlarged view in FIG. 2. Upstream of the die head is the processing section 8. After the die plate 7, the product enters the cutter 6 and the strands of product exiting the die plate 7 are cut into pellets by a rotating knife (not shown). The rotating knife is powered by a motor 12. The pellets fall into the cutter 6 and either exit the cutter 6 at the bottom or are blown upwards, depending on the product.

An extruder E according to the invention is equipped with a specifically mounted and arranged SSDS between the processing section 8 and the die plate 7, as will be further illustrated below.

FIG. 3 schematically illustrates a side-view of an extruder E according to the invention from the end of the processing section 8 and further downstream to the cutter 6. On the left side, the extruder screw is schematically represented. Further downstream of the processing zone 8, a sanitary start-up and discharge system (SSDS) is installed with a flange F. The SSDS provides for a bypass outlet B that can be opened and closed. The SSDS further comprises a mounting plate M, onto which the valve plate V is arranged (suggested in broken lines). Further downstream of the valve plate V is the die plate D. The die plate D is hinge mounted so that it can be easily swung out for maintenance purposes when the cutter 6 is dismounted. The cutter 6 is located downstream of the die plate D, and it houses a rotary knife (not shown) powered by a motor 12. The cutter 6 is mechanically fastened with rotational locking means (not shown). The general orientation of the cutter 6 vis-à-vis the mounting plate M is safeguarded by guiding pins P extending from the cutter 6 and reaching through complementary holes H in the mounting plate M.

FIGS. 4a and 4b schematically show cross-sectional views of FIG. 3 from the planes Y1 and Y2, respectively, as marked in FIG. 3. FIG. 4a shows the side of the cutter that faces towards the extruder E. Four pins P are located in the corners of the face of the cutter box. In the center of FIG. 4, a circular opening in the face of the cutter 6 which is the product flow channel opens the view on the rotary knife K. The complementary view in FIG. 4b is a view onto the valve plate V with slits 15 that can be fully or partially closed when the valve plate V is rotated vis-à-vis an underlying base plate with complementary openings (not shown). In the corners of the mounting plate M there are holes H matching with the pins depicted in FIG. 4a that extend from the cutter 6 towards the mounting plate M.

FIG. 5a shows the locking ring R with elements 13 of the first set of mechanical fastening elements. The elements 13 are elevated structures extending outwards on the circumference of the locking ring R. The elements 13 have a tapered surface 16 that matches with complementary tapered surfaces of elements 14 of a second set of mechanical fastening elements provided on the mounting plate M, as depicted in FIG. 5b. The elements 14 are angle brackets, wherein one flank of the bracket substantially extends parallel to the paper plane, and the other flank of the bracket extends downwards into the paper plane on the left side of FIG. 5b, thus forming an undercut. The undercut has a tapered surface 17 which is complementary to the tapered surface 16 on the elements 13. Upon rotation of the locking ring R vis-à-vis the mounting plate, the elements 13 can slide into the undercut of the angle bracket, whereby the locking ring R (and the cutter) gets mechanically fastened on the mounting plate.

The invention claimed is:

1. A single screw extruder for extrusion of food or feed, the single screw extruder comprising in a direction of flow of a product to be extruded:
    i) a processing section;
    ii) a bypass outlet;
    ii) a valve plate;
    iii) a die plate;
    iv) a cutter with at least one rotating knife in a cutter housing;
    wherein the flow of product can be directed
        through the valve plate under normal operating conditions of the extruder, and
        through the bypass outlet, during start-up of the extruder or for maintenance purposes, downstream of the valve plate;
    the valve plate (V) is arranged on or in a mounting plate;
    the cutter housing and the mounting plate are provided with interacting guiding means that prevent rotation of the cutter housing vis-à-vis the mounting plate; and
    the cutter housing and the mounting plate are mechanically fastened to each other by rotational locking means.

2. The single screw extruder according to claim 1, wherein the interacting guiding means that prevent rotation of the cutter housing, vis-à-vis the mounting plate, are:
    pins; and
    holes or blind holes.

3. The single screw extruder according to claim 2, wherein the interacting guiding means are the pins, and the pins are provided on the cutter housing.

4. The single screw extruder according to claim 2, wherein the interacting guiding means are the holes or blind holes, and the holes or blind holes are provided in the mounting plate.

5. The single screw extruder according to claim 1, wherein the rotational locking means that mechanically fasten the cutter housing and the mounting plate to each other are:
    a rotatable locking ring, provided with a first set of mechanical fastening elements; and
    a second set of mechanical fastening elements that interlock with the first set of mechanical fastening elements.

6. The single screw extruder according to claim 5, wherein the second set of mechanical fastening elements is positionally fixed.

7. The single screw extruder according to claim 5, wherein
    the rotatable locking ring with the first set of mechanical fastening elements is provided on the cutter housing; and
    the second set of mechanical fastening elements is provided on the mounting plate.

8. The single screw extruder according to claim 5, wherein elements of the second set of mechanical fastening elements are angle brackets extending away from the mounting plate towards the cutter housing, which angle brackets provide undercuts that are engaged behind by elements of the first set of mechanical fastening elements.

9. The single screw extruder according to claim 5, wherein the first set of mechanical fastening elements and the second set of mechanical fastening elements have complementary tapered surfaces that are friction-locked against each other when the cutter housing and the mounting plate are mechanically fastened to each other.

10. The single screw extruder according to claim 5, wherein the first set of mechanical fastening elements is a male thread, either continuous or segmented; and the second set of mechanical fastening elements is a female thread, either continuous or segmented.

11. The single screw extruder according to claim 5, wherein the first set of mechanical fastening elements and the second set of mechanical fastening elements are complementary elements of a bayonet coupling.

12. The single screw extruder according to claim 5, wherein
    the locking ring with the first set of mechanical fastening elements; and/or
    the second set of mechanical fastening elements
    is/are pneumatically operated, hydraulically operated or operated by a motor.

13. The single screw extruder according to claim 1, wherein the position in which the cutter housing and the mounting plate are mechanically fastened to each other, by the rotational locking means, can be mechanically locked.

14. The single screw extruder according to claim 1, wherein the die plate is hinge-mounted so that the die plate can be swiveled out when the cutter housing is dismounted.

15. A method of mounting the extruder according to claim 1, comprising the steps of:
    providing the mounting plate;
    providing the cutter with the at least one rotating knife in the cutter housing;
    wherein the cutter housing and the mounting plate are equipped with the interacting guiding means;
    arranging the cutter housing and the mounting plate such that the interacting guiding means prevents rotation of the cutter housing vis-à-vis the mounting plate; and
    mechanically fastening the cutter housing at the mounting plate with the rotational locking means provided on the mounting plate and the cutter housing.

16. The method according to claim 15, wherein the interacting guiding means are pins, and holes or blind holes.

17. A method of operating the extruder according to claim 1, wherein
- the valve plate is closed, downstream of the valve plate, during start-up of the extruder or for maintenance purposes in order to direct the flow of product through the bypass outlet; and/or
- the valve plate is at least partially opened under normal operating conditions of the extruder.

* * * * *